(12) United States Patent
Xu et al.

(10) Patent No.: US 11,349,965 B1
(45) Date of Patent: May 31, 2022

(54) SELF-DESCRIBING CABLE

(71) Applicant: Dell Products L.P., Round Rock, TX (US)

(72) Inventors: Yuchen Xu, Cedar Park, TX (US); Timothy M. Lambert, Austin, TX (US); Jeffrey L. Kennedy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/124,774

(22) Filed: Dec. 17, 2020

(51) Int. Cl.
*H04L 69/22* (2022.01)
*H01B 13/34* (2006.01)
*H04L 69/24* (2022.01)

(52) U.S. Cl.
CPC ............. *H04L 69/22* (2013.01); *H01B 13/34* (2013.01); *H04L 69/24* (2013.01)

(58) Field of Classification Search
None
See application file for complete search history.

(56) References Cited

U.S. PATENT DOCUMENTS

| | | | |
|---|---|---|---|
| 9,148,001 B1* | 9/2015 | Mohanty | G06F 1/263 |
| 9,729,433 B2* | 8/2017 | Polland | H04L 43/10 |
| 10,498,619 B2* | 12/2019 | Goodrum | H04L 43/50 |
| 10,692,344 B1* | 6/2020 | Lerner | G08B 25/016 |
| 2015/0356289 A1* | 12/2015 | Brown | H04W 12/06 726/7 |
| 2020/0145495 A1* | 5/2020 | Coffey | H02J 13/00022 |
| 2021/0185095 A1* | 6/2021 | Harel | H04L 63/20 |

* cited by examiner

*Primary Examiner* — Lonnie V Sweet
(74) *Attorney, Agent, or Firm* — Jackson Walker L.L.P.

(57) ABSTRACT

A system may include a controller, an endpoint device, and a cable coupled between the controller and the endpoint device and comprising a communication wire for bidirectionally communicating signals between the controller and the endpoint device and a circuit formed as a part of the cable and communicatively coupled to the communication wire, the circuit having a microcontroller unit configured to communicate identifying information regarding the cable to the controller via the communication wire and without contention with the signals bidirectionally communicated between the controller and the endpoint device.

27 Claims, 8 Drawing Sheets

SELF-DESCRIBING CABLE

TECHNICAL FIELD

The present disclosure relates in general to information handling systems, and more particularly to systems and methods associated with a self-describing cable.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In many applications, one or multiple information handling servers may be installed within a single chassis, housing, enclosure, or rack. Communication between or within servers and/or between enclosures may often be accomplished via cables, and many communications standards and protocols employ a copper cable implementation for differential signaling.

A major concern in manufacture, design, and implementation of information handling systems is configuration flexibility, through a myriad of backplanes, risers, other printed circuits, and/or internally-cabled configurations. Of importance in validating configurations in an information handling system is ensuring that cables coupled between components support a communication fabric type, speed, signal integrity, and other parameters for communication between the components. In addition, knowledge of physical characteristics may enable configuration of a communications channel, such as bus speed limiting, and/or tuning, for example.

SUMMARY

In accordance with the teachings of the present disclosure, the disadvantages and problems associated with traditional approaches to use of cables in an information handling system may be substantially reduced or eliminated.

In accordance with embodiments of the present disclosure, a system may include a controller, an endpoint device, and a cable coupled between the controller and the endpoint device and comprising a communication wire for bidirectionally communicating signals between the controller and the endpoint device and a circuit formed as a part of the cable and communicatively coupled to the communication wire, the circuit having a microcontroller unit configured to communicate identifying information regarding the cable to the controller via the communication wire and without contention with the signals bidirectionally communicated between the controller and the endpoint device.

In accordance with these and other embodiments of the present disclosure, a method may include, in a cable comprising a communication wire for bidirectionally communicating signals between a controller and an endpoint device: communicating, by a microcontroller integral to a circuit formed as a part of the cable and communicatively coupled to the communication wire, identifying information regarding the cable to the controller via the communication wire and without contention with the signals bidirectionally communicated between the controller and the endpoint device.

In accordance with these and other embodiments of the present disclosure, a self-describing cable may include a communication wire for bidirectionally communicating signals between a controller and an endpoint device and a circuit formed as a part of the cable and communicatively coupled to the communication wire, the circuit having a microcontroller unit configured to communicate identifying information regarding the cable to the controller via the communication wire and without contention with the signals bidirectionally communicated between the controller and the endpoint device.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 8, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, air movers, sensors, power supplies, and/or any other components and/or elements of an information handling system.

Figure 1:
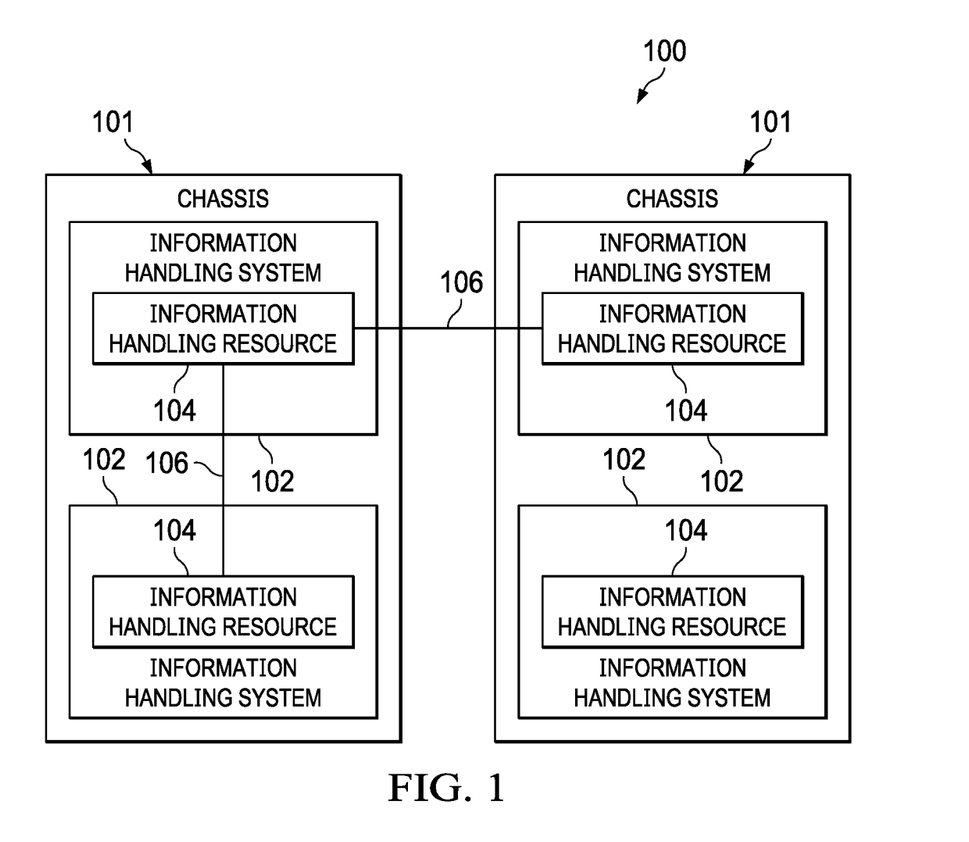
FIG. 1 illustrates a system comprising a plurality of chassis, each chassis comprising at least one information handling system, in accordance with embodiments of the present disclosure.

FIG. 1 illustrates a system 100 comprising a plurality of chassis 101, each chassis 101 comprising at least one information handling system 102, in accordance with embodiments of the present disclosure. Each chassis 101 may be an enclosure that serves as a container for various information handling systems 102 and information handling resources 104, and may be constructed from steel, aluminum, plastic, and/or any other suitable material. Although the term "chassis" is used, a chassis 101 may also be referred to as a case, cabinet, tower, box, enclosure, and/or housing. In certain embodiments, a chassis 101 may be configured to hold and/or provide power to one or more information handling systems 102 and/or information handling resources 104.

In some embodiments, one or more of information handling systems 102 may comprise servers. For example, in some embodiments, information handling systems 102 may comprise rack servers and each chassis 101 may comprise a rack configured to house such rack servers. As shown in FIG. 1, each information handling system 102 may include one or more information handling resources 104. An information handling resource 104 may include any component system, device or apparatus of an information handling system 102, including without limitation processors, service processors, basic input/output systems, buses, memories, I/O devices and/or interfaces, storage resources, network interfaces, motherboards, air movers, sensors, power supplies, and/or any other components and/or elements of an information handling system. For example, in some embodiments, an information handling resource 104 of an information handling system 102 may comprise a processor. Such processor may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, a processor may interpret and/or execute program instructions and/or process data stored in a memory and/or another information handling resource of an information handling system 102.

In these and other embodiments, an information handling resource 104 of an information handling system 102 may comprise a memory. Such a memory may be communicatively coupled to an associated processor and may include any system, device, or apparatus configured to retain program instructions and/or data for a period of time (e.g., computer-readable media). A memory may include RAM, EEPROM, a PCMCIA card, flash memory, magnetic storage, opto-magnetic storage, or any suitable selection and/or array of volatile or non-volatile memory that retains data after power to an associated information handling system 102 is turned off.

In addition to a processor and/or a memory, an information handling system 102 may include one or more other information handling resources.

As shown in FIG. 1, information handling resources 104 may be communicatively coupled to each other via a cable 106, whether such information handling resources 104 are within different information handling systems 102 in the same chassis 101, or are in different chassis 101. A cable 106 may include any suitable assembly of two or more electrically-conductive wires running side by side to carry one or more signals between information handling resources. In some embodiments, cable 106 may comprise a self-describing cable, as described in greater detail below.

Figure 2:
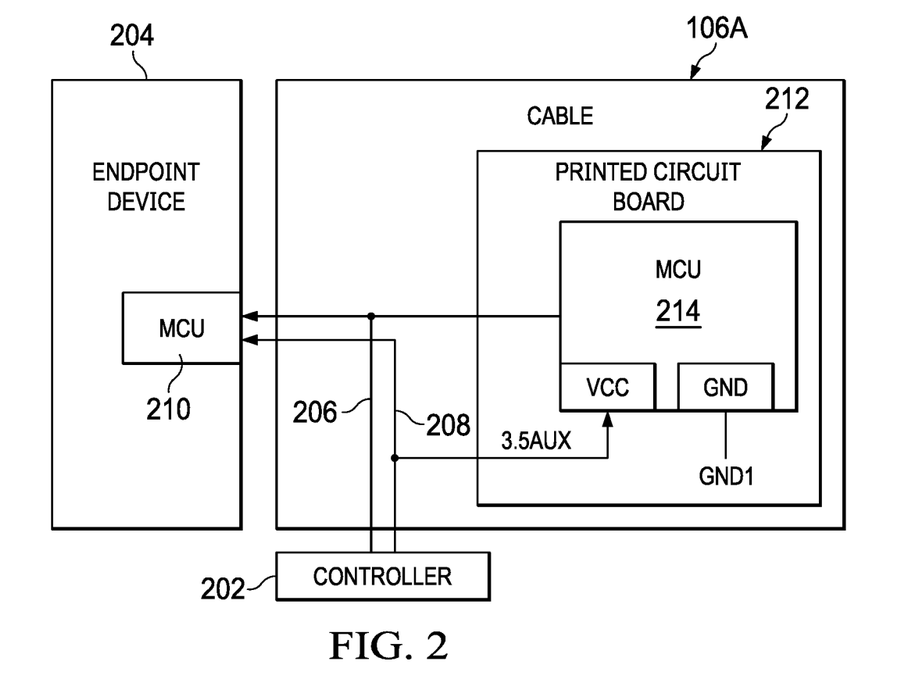
FIG. 2 illustrates a block diagram of an example subsystem comprising a transmitting device, a self-describing cable, and a receiving device, in accordance with embodiments of the present disclosure.
Figure 3:
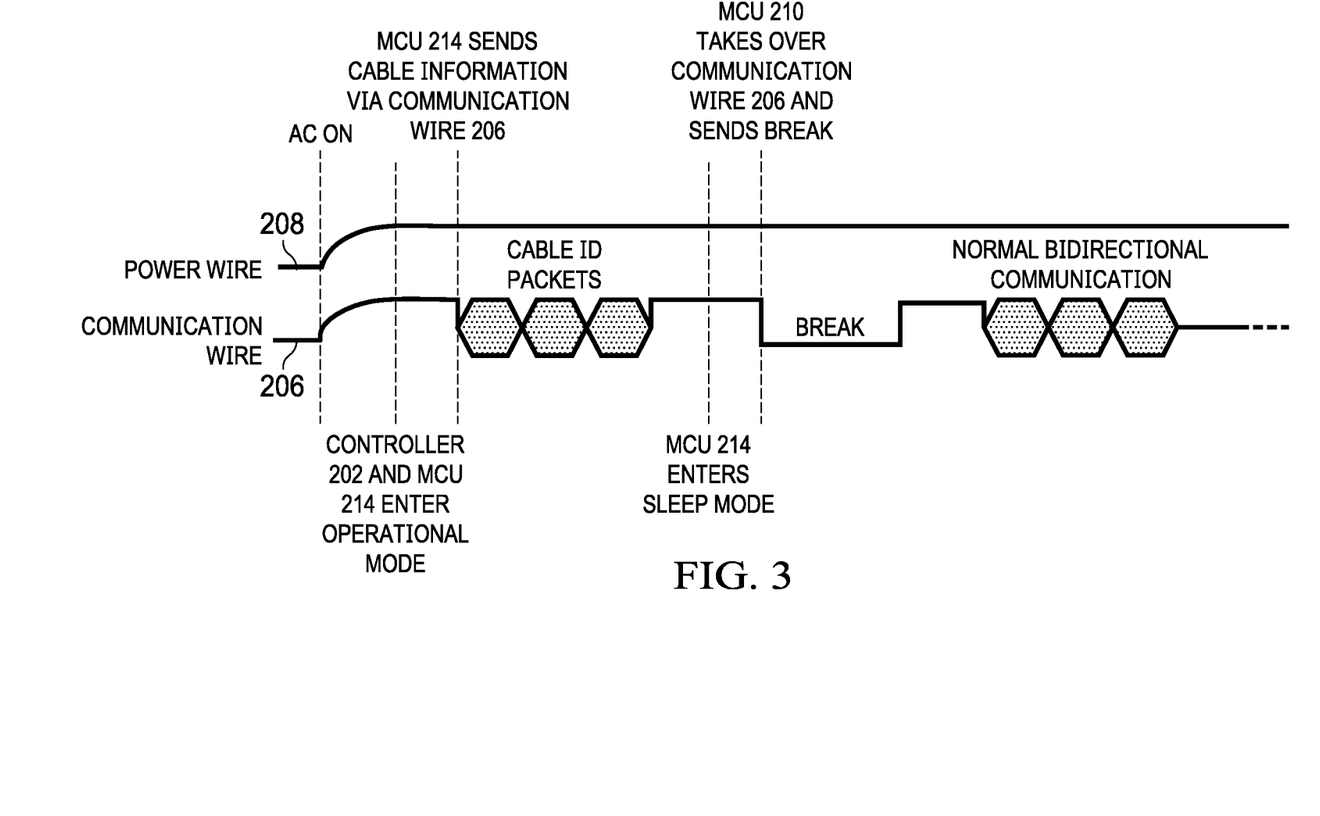
FIG. 3 illustrates a timing diagram of selected signals for operation of the self-describing cable depicted in FIG. 2, in accordance with embodiments of the present disclosure.

FIG. 2 illustrates a block diagram of an example subsystem comprising a controller 202, a self-describing cable 106A, and an endpoint device 204, in accordance with embodiments of the present disclosure. Self-describing cable 106A as shown in FIG. 2 may be used to implement one or more cables 106 depicted in FIG. 1.

Controller 202 may comprise any suitable system, device, or apparatus configured to bidirectionally communicate signals with endpoint device 204 via a communication wire 206 or self-describing cable 106A and provide an auxiliary voltage rail (e.g., 3.3 volts) to endpoint device 204 via a power wire 208 of self-describing cable 106A. For example, in some embodiments, controller 202 may comprise a management controller configured to provide management facilities for management of an information handling system 102 comprising controller 202 and endpoint device 204. Such management controller may include or may be an integral part of a baseboard management controller (BMC), a remote access controller (e.g., a Dell Remote Access Controller or Integrated Dell Remote Access Controller), a service processor, or access controller. As another example, controller 202 may comprise a complex programmable logic device (CPLD) associated with a management controller.

Endpoint device 204 may comprise any suitable system, device, or apparatus configured to receive management communications from controller 202. In some embodiments, endpoint device 204 may also be configured to communicate data with a host system of an information handling system comprising controller 202. For example, in some embodiments, endpoint device 204 may include an input/output device, such as, for example, a solid-state drive. As shown in FIG. 2, endpoint device 204 may comprise a microcontroller unit (MCU) 210 for controlling all or a portion of functionality of endpoint device 204, including serving as a communications interface between controller 202 and endpoint device 204.

Self-describing cable 106A may have a plurality of wires, including communication wire 206 and power wire 208 described above. Other wires integral to self-describing cable 106A may not be shown in FIG. 2 in order to aid in clarity and exposition of FIG. 2. As shown in FIG. 2, self-describing cable 106A may include a small printed circuit board 212 communicatively coupled to communication wire 206 and power wire 208. For example, in some embodiments, printed circuit board 212 may be approximately the size of a postage stamp. Printed circuit board 212 may be integrated within self-describing cable 106A in any suitable manner, whether extending (at least in part) from an electrically-insulated sheath housing communication wire 206 and power wire 208 or in another form factor.

In operation, upon an initial alternating current (AC) power on of an information handling system, the auxiliary voltage on power wire 208 may become available, even if a host system of the information handling system (e.g., processor, memory, etc.) remains powered down. After the auxiliary voltage rises to a sufficient level, as shown in the timing diagram of FIG. 3 (which may not be shown to scale), controller 202 and an MCU 214 of printed circuit board 212 may enter an operational mode. After entering the operational mode, MCU 214 may be configured to communicate, to controller 202 via communication wire 206, identifying information regarding self-describing cable 106A. Such identifying information may include one or more attributes of self-describing cable 106A, including without limitation a cable length, cable gauge, cable material, cable impedance, cable manufacturer part number, cable destination connector type, and/or other relevant information. After communication of the identifying information, MCU 214 may enter a sleep mode until occurrence of the next AC power cycle of the information handling system. Further, once the burst of packets of identifying information is complete, MCU 210 may communicate a break pulse on communication wire 206, after which MCU 210 and controller 202 may initiate normal directional communication of management information.

Figure 4:
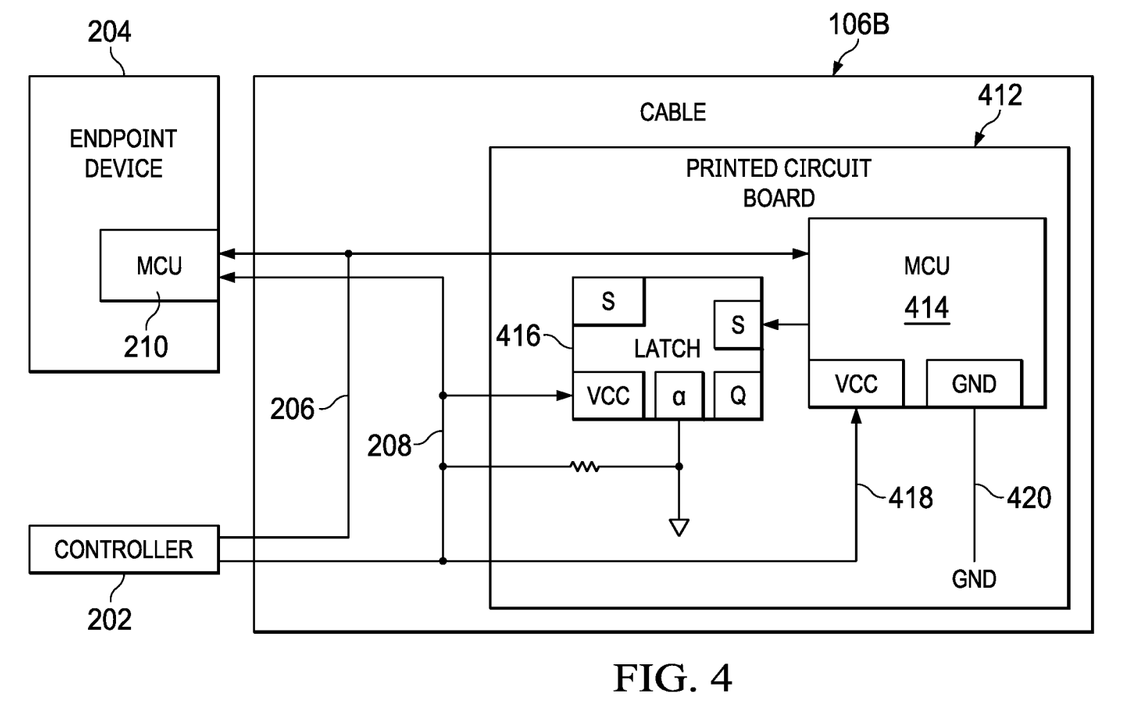
FIG. 4 illustrates a block diagram of another example subsystem comprising a transmitting device, a self-describing cable, and a receiving device, in accordance with embodiments of the present disclosure.
Figure 5:
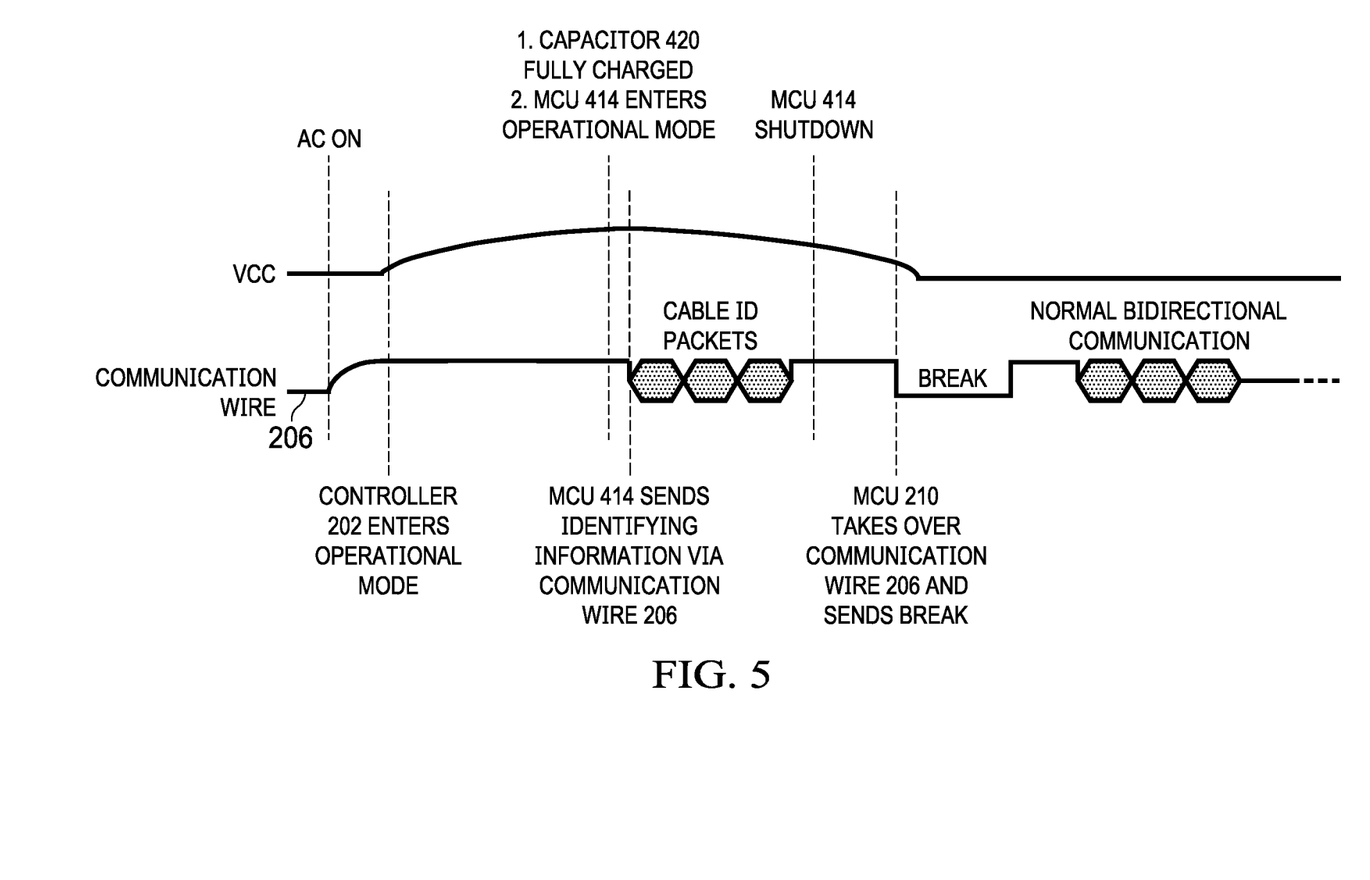
FIG. 5 illustrates a timing diagram of selected signals for operation of the self-describing cable depicted in FIG. 4, in accordance with embodiments of the present disclosure.

FIG. 4 illustrates a block diagram of an example subsystem comprising a controller 202, a self-describing cable 106B, and an endpoint device 204, in accordance with embodiments of the present disclosure. Self-describing cable 106B as shown in FIG. 4 may be used to implement one or more cables 106 depicted in FIG. 1. Controller 202 and endpoint device 204 of FIG. 4 may be similar or identical to controller 202 and endpoint device 204 of FIG. 2.

Self-describing cable 106B may have a plurality of wires, including communication wire 206 and power wire 208 described above. Other wires integral to self-describing cable 106B may not be shown in FIG. 4 in order to aid in clarity and exposition of FIG. 4. As shown in FIG. 4, self-describing cable 106B may include a small printed circuit board 412 communicatively coupled to communication wire 206 and power wire 208. For example, in some embodiments, printed circuit board 412 may be approximately the size of a postage stamp. Printed circuit board 412 may be integrated within self-describing cable 106B in any suitable manner, whether extending (at least in part) from an electrically-insulated sheath housing communication wire 206 and power wire 208 or in another form factor.

In operation, upon an initial AC power on of an information handling system, the auxiliary voltage on power wire 208 may become available, even if a host system of the information handling system (e.g., processor, memory, etc.) remains powered down. After the auxiliary voltage rises to a sufficient level, as shown in the timing diagram of FIG. 5 (which may not be shown to scale), controller 202 may enter an operational mode. Power wire 208 may charge capacitor 420 via transistor 418, such that a voltage VCC across capacitor 420 charges up to approximately the auxiliary voltage on power wire 208. Once capacitor 420 is fully charged, MCU 414 may enter an operational mode. In the operational mode, MCU 414 may assert a signal on a "set" input of a set-reset latch 416 in order to deactivate (e.g., open, disable, turn off) transistor 418, thus decoupling capacitor 420 from power wire 208, such that MCU 414 is powered entirely from stored charge on capacitor 420. Such stored charge may be sufficient to enable MCU 414 to communicate, to controller 202 via communication wire 206, identifying information regarding self-describing cable 106B. Such identifying information may include one or more attributes of self-describing cable 106B, including without limitation a cable length, cable gauge, cable material, cable impedance, cable manufacturer part number, cable destination connector type, and/or other relevant information. After communication of the identifying information, the remaining stored charge on capacitor 420 may not be sufficient to power MCU 414, and MCU 414 may shut down (e.g., until occurrence of the next AC power cycle of the information handling system). Further, once the burst of packets of identifying information is complete, MCU 210 may communicate a break pulse on communication wire 206, after which MCU 210 and controller 202 may initiate normal directional communication of management information.

Figure 6:
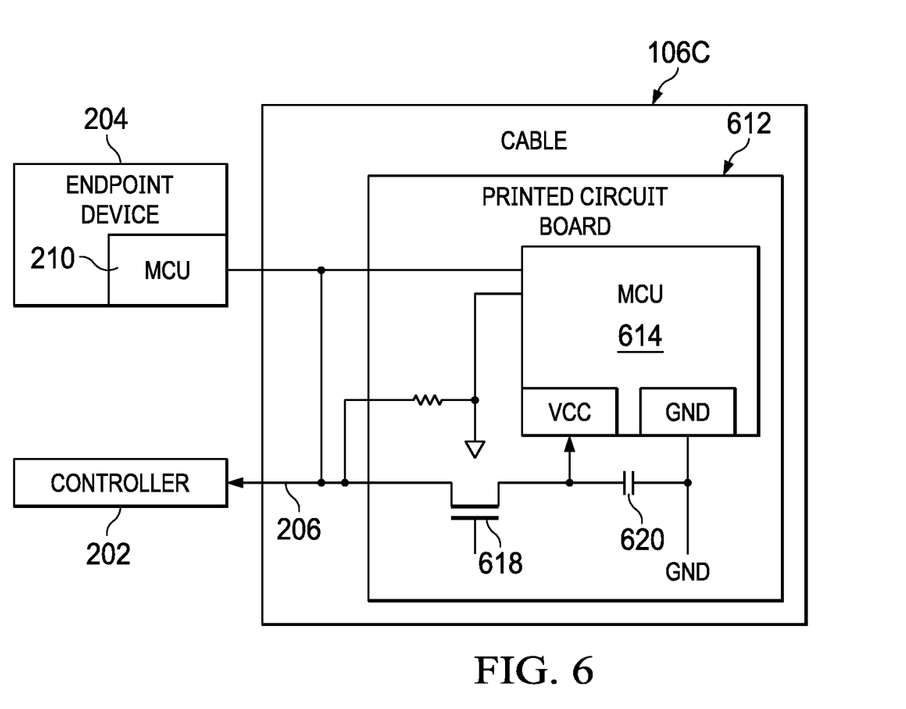
FIG. 6 illustrates a block diagram of yet another example subsystem comprising a transmitting device, a self-describing cable, and a receiving device, in accordance with embodiments of the present disclosure.

FIG. 6 illustrates a block diagram of an example subsystem comprising a controller 202, a self-describing cable 106C, and an endpoint device 204, in accordance with embodiments of the present disclosure. Self-describing cable 106C as shown in FIG. 6 may be used to implement one or more cables 106 depicted in FIG. 1. Controller 202 and endpoint device 204 of FIG. 6 may be similar or identical to controller 202 and endpoint device 204 of FIG. 2 and similar or identical to controller 202 and endpoint device 204 of FIG. 4. However, as shown in FIG. 6, auxiliary voltage may not be available to cable 106C.

Self-describing cable 106C may have a plurality of wires, including communication wire 206 described above. Other wires integral to self-describing cable 106C may not be shown in FIG. 6 in order to aid in clarity and exposition of FIG. 6. As shown in FIG. 6, self-describing cable 106C may include a small printed circuit board 612 communicatively coupled to communication wire 206. For example, in some embodiments, printed circuit board 612 may be approximately the size of a postage stamp. Printed circuit board 612 may be integrated within self-describing cable 106C in any suitable manner, whether extending (at least in part) from an electrically-insulated sheath housing communication wire 206 or in another form factor.

Figure 7:
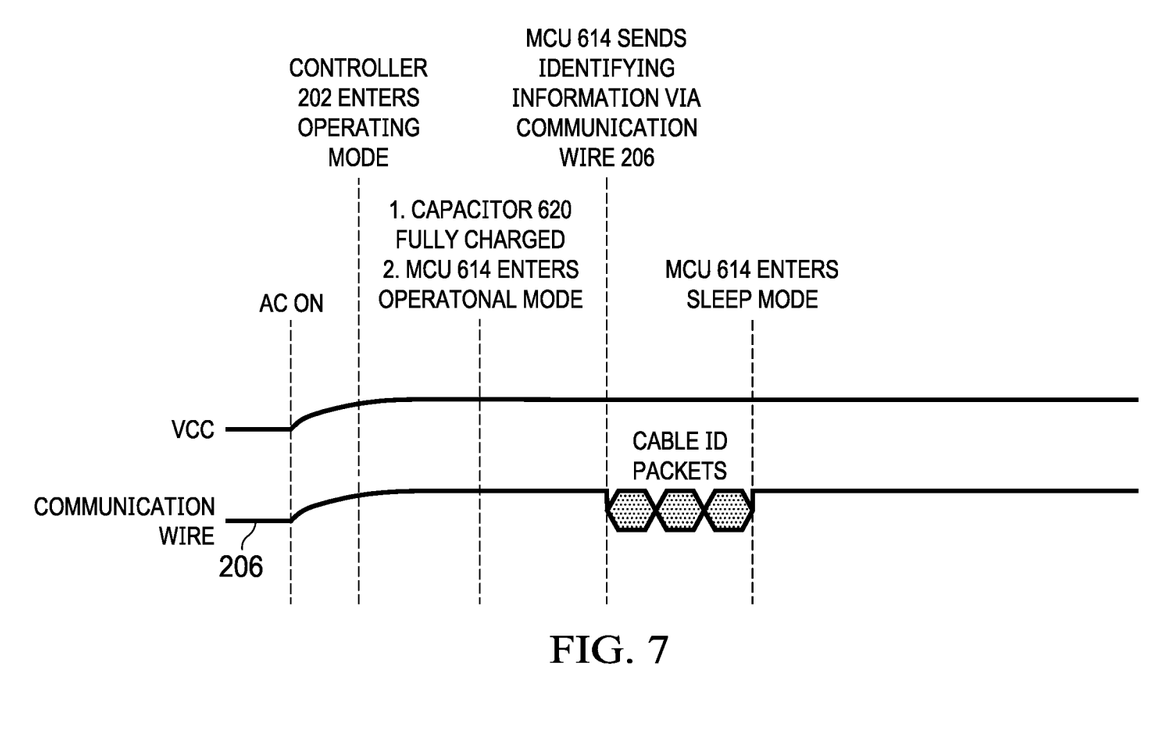
FIG. 7 illustrates a timing diagram of selected signals for operation of the self-describing cable depicted in FIG. 6, in accordance with embodiments of the present disclosure.

In operation, upon an initial AC power on of an information handling system, an auxiliary voltage may become available to controller 202, and controller 202 may enter an operational mode, as shown in the timing diagram of FIG. 7 (which may not be shown to scale). Further upon AC power on, a voltage on communication wire 206 may increase and may charge capacitor 620 via transistor 618, such that a voltage VCC across capacitor 620 charges up to approximately the voltage on communication wire 206. Once capacitor 620 is sufficiently charged, MCU 614 may enter an operational mode. In the operational mode, MCU 614 may deactivate (e.g., open, disable, turn off) transistor 618, thus decoupling capacitor 620 from communication wire 206, such that MCU 614 is powered entirely from stored charge on capacitor 620. Such stored charge may be sufficient to enable MCU 614 to communicate, to controller 202 via communication wire 206, identifying information regarding self-describing cable 106C. Such identifying information may include one or more attributes of self-describing cable 106C, including without limitation a cable length, cable gauge, cable material, cable impedance, cable manufacturer part number, cable destination connector type, and/or other relevant information. After communication of the identifying information, MCU 614 may enter a sleep mode (e.g., until occurrence of the next AC power cycle of the information handling system or after communication wire 206 goes low for a period of time). Notably, the architecture shown in FIG. 6 is such that MCU 614 may periodically wake up and communicate identifying information to endpoint device 204.

Figure 8:
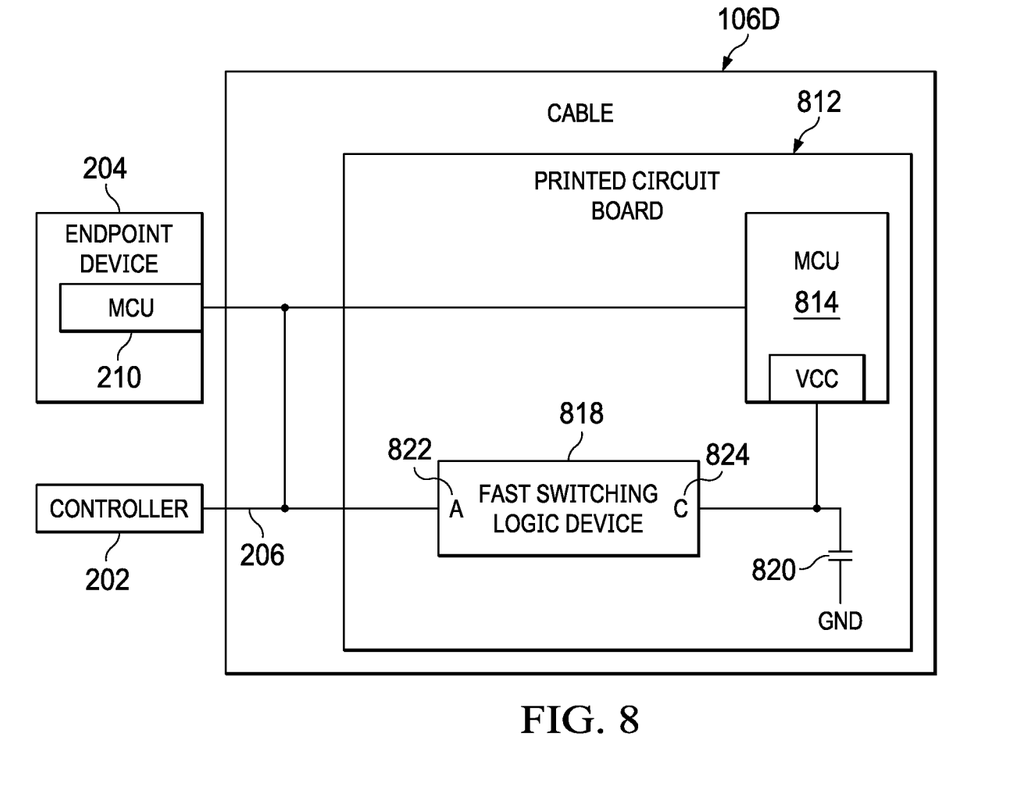
FIG. 8 illustrates a block diagram of a further example subsystem comprising a transmitting device, a self-describing cable, and a receiving device, in accordance with embodiments of the present disclosure.

FIG. 8 illustrates a block diagram of example subsystem comprising a controller 202, a self-describing cable 106D, and an endpoint device 204, in accordance with embodiments of the present disclosure. Self-describing cable 106D as shown in FIG. 8 may be used to implement one or more cables 106 depicted in FIG. 1. Controller 202 and endpoint device 204 of FIG. 8 may be similar or identical to controller 202 and endpoint device 204 of FIG. 2, similar or identical to controller 202 and endpoint device 204 of FIG. 4, and similar or identical to controller 202 and endpoint device 204 of FIG. 6. However, as shown in FIG. 8, auxiliary voltage may not be available to cable 106D as is the case in FIGS. 2 and 4.

Self-describing cable 106D may have a plurality of wires, including communication wire 206 described above. Other wires integral to self-describing cable 106D may not be shown in FIG. 8 in order to aid in clarity and exposition of FIG. 8. As shown in FIG. 8, self-describing cable 106D may include a small printed circuit board 812 communicatively coupled to communication wire 206. For example, in some embodiments, printed circuit board 812 may be approximately the size of a postage stamp. Printed circuit board 812 may be integrated within self-describing cable 106D in any suitable manner, whether extending (at least in part) from an electrically-insulated sheath housing communication wire 206 or in another form factor.

In operation, upon an initial AC power on of an information handling system, an auxiliary voltage may become available to controller 202, and controller 202 may enter an operational mode. Further upon AC power on, a voltage on communication wire 206 may increase. When a voltage at an input 822 of a fast-switching logic device 818 (e.g., a diode) is larger than that at an output 824 of fast-switching logic device 818, fast-switching logic device 818 may electrically couple input 822 to output 824 and thus communication wire 206 may charge capacitor 820 via fast-switching logic device 818, such that a voltage VCC across capacitor 820 charges up to approximately the voltage on communication wire 206. Once capacitor 820 is sufficiently charged, MCU 814 may enter an operational mode. In the operational mode, MCU 814 may initially listen via communication wire 206 for a predefined signaling pulse from controller 202. After receipt of such predefined signaling pulse, MCU 814 may communicate, to controller 202 via communication wire 206, identifying information regarding self-describing cable 106D. Such identifying information may include one or more attributes of self-describing cable 106D, including without limitation a cable length, cable gauge, cable material, cable impedance, cable manufacturer part number, cable destination connector type, and/or other relevant information. MCU 814 may be powered by stored charge on capacitor 820 during this time of communicating identifying information. During the burst of identifying information, when the voltage on input 822 drops below the voltage on output 824 by a sufficient amount, fast switching logic 818 may isolate the power rail pin of MCU 814 from communication wire 206, to allow MCU 814 to be powered from the stored charge on capacitor 820, without such capacitor voltage affecting signaling on communication wire 206. MCU 814 may be configured to sleep after communicating the burst of identifying information while listening on communication wire 206 for another instance of the predefined signaling pulse, upon which it may again communicate identifying information while decoupling the power rail pin of MCU 814 from communication wire 206.

In the foregoing description, various cables 106 have been shown comprising a printed circuit board with various components. However, it is understood that in some embodiments, a circuit comprising components depicted herein as being mounted to a printed circuit board (e.g., MCU, capacitor, logic devices, etc.) could be assembled directly within or on a cable 106 itself.

One advantage of the previously-described systems and methods is that they may allow communication between controller 202 and endpoint device 210 to occur on the same wire as communication of identifying information from a self-describing cable 106 to controller 202 without contention between the two types of communication. An endpoint device 210 may avoid contention by either waiting for a timeout period for a burst of identifying information (as would be the case in cables not supporting self-describing features) or waiting until after the burst of identifying information is complete (and in some instances, a break is communicated on the wire).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system, comprising:
   a controller;
   an endpoint device; and
   a cable coupled between the controller and the endpoint device and comprising:
      a communication wire for bidirectionally communicating signals between the controller and the endpoint device; and
      a circuit formed as a part of the cable and communicatively coupled to the communication wire, the circuit having:
         a microcontroller unit configured to communicate identifying information regarding the cable to the controller via the communication wire and without contention with the signals bidirectionally communicated between the controller and the endpoint device; and
         circuitry configured to:
            transfer electrical charge from the communication wire to a capacitor integral to the circuit in order to power the microcontroller unit from the capacitor; and
            isolate the capacitor from the communication wire when the microcontroller unit communicates identifying information on the communication wire.

2. The system of claim 1, wherein the cable further comprises a power wire configured to transfer electrical energy from the controller to the endpoint device, wherein the microcontroller unit is powered from the power wire.

3. The system of claim 1, wherein the cable further comprises:
   a power wire configured to transfer electrical energy from the controller to the endpoint device; and
   wherein the circuitry is further configured to transfer electrical charge from the power wire to the capacitor integral to the circuit in order to power the microcontroller unit from the capacitor.

4. The system of claim 1, wherein the microcontroller unit is further configured to enter a sleep mode or power down after communicating the identifying information.

5. The system of claim 1, wherein the identifying information comprises one or more of a cable length, a cable gauge, a cable material, a cable impedance, a cable manufacturer part number, and a cable destination connector type.

6. A method comprising, in a cable comprising a communication wire for bidirectionally communicating signals between a controller and an endpoint device:
   communicating, by a microcontroller integral to a circuit formed as a part of the cable and communicatively coupled to the communication wire, identifying information regarding the cable to the controller via the communication wire and without contention with the signals bidirectionally communicated between the controller and the endpoint devices;
   transferring, with circuitry integral to the circuit, electrical charge from the communication wire to a capacitor integral to the circuit in order to power the microcontroller unit from the capacitor; and
   isolating, with the circuitry, the capacitor from the communication wire when the microcontroller unit communicates identifying information on the communication wire.

7. The method of claim 6, wherein the cable further comprises a power wire configured to transfer electrical energy from the controller to the endpoint device, and the method further comprises powering the microcontroller unit from the power wire.

8. The method of claim 6, wherein the cable further comprises a power wire configured to transfer electrical energy from the controller to the endpoint device, and the method further comprises transferring, with the circuitry integral to the circuit, from the power wire to the capacitor integral to the circuit in order to power the microcontroller unit from the capacitor.

9. The method of claim 6, further comprising causing the microcontroller unit to enter a sleep mode or power down after communicating the identifying information.

10. The method of claim 6, wherein the identifying information comprises one or more of a cable length, a cable gauge, a cable material, a cable impedance, a cable manufacturer part number, and a cable destination connector type.

11. A self-describing cable, comprising:
   a communication wire for bidirectionally communicating signals between a controller and an endpoint device; and
   a circuit formed as a part of the cable and communicatively coupled to the communication wire, the circuit having:

a microcontroller unit configured to communicate identifying information regarding the cable to the controller via the communication wire and without contention with the signals bidirectionally communicated between the controller and the endpoint device; and circuitry configured to:
- transfer electrical charge from the communication wire to a capacitor integral to the circuit in order to power the microcontroller unit from the capacitor; and
- isolate the capacitor from the communication wire when the microcontroller unit communicates identifying information on the communication wire.

12. The self-describing cable of claim 11, further comprising a power wire configured to transfer electrical energy from the controller to the endpoint device, wherein the microcontroller unit is powered from the power wire.

13. The self-describing cable of claim 11, further comprising:
- a power wire configured to transfer electrical energy from the controller to the endpoint device; and
- wherein the circuitry is further configured to transfer electrical charge from the power wire to the capacitor integral to the circuit in order to power the microcontroller unit from the capacitor.

14. The self-describing cable of claim 11, wherein the microcontroller unit is further configured to enter a sleep mode or power down after communicating the identifying information.

15. The self-describing cable of claim 11, wherein the identifying information comprises one or more of a cable length, a cable gauge, a cable material, a cable impedance, a cable manufacturer part number, and a cable destination connector type.

16. A system, comprising:
- a controller;
- an endpoint device; and
- a cable coupled between the controller and the endpoint device and comprising:
  - a communication wire for bidirectionally communicating signals between the controller and the endpoint device;
  - a power wire configured to transfer electrical energy from the controller to the endpoint device; and
  - a circuit formed as a part of the cable and communicatively coupled to the communication wire, the circuit having a microcontroller unit configured to communicate identifying information regarding the cable to the controller via the communication wire and without contention with the signals bidirectionally communicated between the controller and the endpoint device, and wherein the circuitry is circuitry configured to:
    - transfer electrical charge from the power wire to a capacitor integral to the circuit in order to power the microcontroller unit from the capacitor; and
    - isolate the capacitor from the power wire when the microcontroller unit communicates identifying information on the communication wire.

17. The system of claim 16, wherein the cable further comprises a power wire configured to transfer electrical energy from the controller to the endpoint device, wherein the microcontroller unit is powered from the power wire.

18. The system of claim 16, wherein the microcontroller unit is further configured to enter a sleep mode or power down after communicating the identifying information.

19. The system of claim 16, wherein the identifying information comprises one or more of a cable length, a cable gauge, a cable material, a cable impedance, a cable manufacturer part number, and a cable destination connector type.

20. A method comprising, in a cable comprising a communication wire for bidirectionally communicating signals between a controller and an endpoint device and wherein the cable further comprises a power wire configured to transfer electrical energy from the controller to the endpoint device:
- communicating, by a microcontroller integral to a circuit formed as a part of the cable and communicatively coupled to the communication wire, identifying information regarding the cable to the controller via the communication wire and without contention with the signals bidirectionally communicated between the controller and the endpoint device;
- transferring, with circuitry integral to the circuit, from the power wire to a capacitor integral to the circuit in order to power the microcontroller unit from the capacitor; and
- isolating, with the circuitry, the capacitor from the power wire when the microcontroller unit communicates identifying information on the communication wire.

21. The method of claim 20, wherein the cable further comprises a power wire configured to transfer electrical energy from the controller to the endpoint device, and the method further comprises powering the microcontroller unit from the power wire.

22. The method of claim 20, further comprising causing the microcontroller unit to enter a sleep mode or power down after communicating the identifying information.

23. The method of claim 20, wherein the identifying information comprises one or more of a cable length, a cable gauge, a cable material, a cable impedance, a cable manufacturer part number, and a cable destination connector type.

24. A self-describing cable, comprising:
- a communication wire for bidirectionally communicating signals between a controller and an endpoint device;
- a power wire configured to transfer electrical energy from the controller to the endpoint device; and
- a circuit formed as a part of the cable and communicatively coupled to the communication wire, the circuit having a microcontroller unit configured to communicate identifying information regarding the cable to the controller via the communication wire and without contention with the signals bidirectionally communicated between the controller and the endpoint device, and wherein the circuitry is circuitry configured to:
  - transfer electrical charge from the power wire to a capacitor integral to the circuit in order to power the microcontroller unit from the capacitor; and
  - isolate the capacitor from the power wire when the microcontroller unit communicates identifying information on the communication wire.

25. The self-describing cable of claim 24, further comprising a power wire configured to transfer electrical energy from the controller to the endpoint device, wherein the microcontroller unit is powered from the power wire.

26. The self-describing cable of claim 24, wherein the microcontroller unit is further configured to enter a sleep mode or power down after communicating the identifying information.

27. The self-describing cable of claim 24, wherein the identifying information comprises one or more of a cable length, a cable gauge, a cable material, a cable impedance, a cable manufacturer part number, and a cable destination connector type.

* * * * *